UNITED STATES PATENT OFFICE.

ERIK W. ENEQUIST, OF BROOKLYN, NEW YORK.

GLASS AND METHOD OF MAKING IT.

1,261,015.  Specification of Letters Patent.  Patented Apr. 2, 1918.

No Drawing.  Application filed July 20, 1917. Serial No. 181,809.

*To all whom it may concern:*

Be it known that I, ERIK W. ENEQUIST, a citizen of the United States, residing at Brooklyn, in the county of Kings and State of New York, have invented certain new and useful Improvements in Glass and Methods of Making It, of which the following is a specification.

This invention relates to improvements in the methods of manufacturing glass, the object of the invention being to provide an improved method of making glass whereby the strength, temper and appearance of the glass will be materially improved. The improvement, however, has more particularly to do with the manufacture of soda glass, by which I mean glass wherein the principal alkali is soda, although the invention is not necessarily confined to this particular character of glass.

This improved method consists in adding to the basic glass batch a certain proportion of lithia and potassa-bearing minerals, such as lepidolite. For instance, to a soda glass batch, wherein the principal alkali is soda, I add a certain proportion of lepidolite or a similar mineral containing lithia and potassa.

Lepidolite is a mineral largely found in California and other parts of the country and analyzes approximately as follows: lithia 5%, potassa 16%, alumina 27%, silica 48% and fluorin 1%, the balance consisting principally of mechanically combined water and manganese free of iron.

The action of the lepidolite and the water contained therein, which leaves the mineral at a low red heat, serves to agitate and mix the batch. The lithia as well as the potassa are strong fluxes and readily take hold and assist in fusing the sand contained in the batch.

In some cases I may fuse the lepidolite separately or mix it with soda or lime and other chemicals and then bail out the fused material and afterward add it to the regular batch.

In practice, to a basic batch, for instance for making jars, bottles, window or plate glass or other inexpensive glass, I add from one to five per cent., more or less of lepidolite to the entire weight of the batch, which addition assists in fusing the glass and imparts gloss and strength to the same.

To a basic batch for instance for making crystal or pressed glass where soda is the principal alkali, I add from five to twelve per cent. of lepidolite.

In other cases, such for instance as the making of opaque or translucent or special glasses or glasses containing boracic acid, I add up to fifty per cent. of the lepidolite, but in all instances it is found that the addition of lepidolite to the batch very materially improves the strength, temper and appearance of the glass.

In the making of opal or opaque glasses it is essential that the glass batch fuse at a comparatively low temperature so that the active agent, which causes the opaqueness, silicon fluorid, $SiF_4$, may be slowly and evenly generated and retained by the molten glass.

Lepidolite is admirably suited for the making of such glasses because it causes the batch to fuse at a low temperature and the high percentage of alumina contained causes it to produce glasses of superior mechanical quality such as clean cuts or fractures when sheets thereof are cut for table tops or other purposes. The content of fluorin contained in lepidolite is so small that it is hardly a factor in the production of an opaque or opal glass.

The term glass as herein used is intended to cover any vitreous body, such as enamel and glaze and such analogous materials, since enamels and glaze are one form of glass and are very effectively made by the addition of lepidolite thereto.

It is understood of course that I do not confine myself to the exact proportions herein specified as such proportions are given as examples of what has been found to be desirable ones in the manufacture of this improved glass.

In the making of jars, bottles, window or plate glass or other inexpensive glass or for the making of crystal or pressed glass where soda is the principal alkali, the batch to which the lepidolite is added usually consists of the well known materials, such as sand, soda and lime in the proportions well known in the art, and in the making of opaque or translucent or special glasses containing boracic acid, in which instance the batch is itself largely composed of lepidolite in the proportions hereinbefore referred to, the batch consists of sand and soda with or without lime and usually fluor spar and feldspar, and therefore as these several batches from which glass is usually made are well known, a more detailed description thereof is unnecessary and therefore the term "batch" as used in the claims is intended to cover any of the mixtures of raw materials herein just referred to, well known in the art.

I claim as my invention:

1. The method of making glass which consists in adding an appreciable quantity of lepidolite to a glass batch, and then fusing the batch thereby to produce a glass in which the strength, temper and appearance thereof is increased.

2. The method of making glass which consists in adding from one to fifty per cent. of lepidolite to a glass batch, and then fusing the batch.

3. The method of making inexpensive glass, which consists in adding to a glass batch from one to five per cent. of lepidolite, and then fusing the batch.

4. The method of making crystal or pressed glass, which consists in adding to a glass batch from five to twelve per cent. of lepidolite, and then fusing the whole batch.

5. The method of making soda glass, which consists in adding to a glass batch a predetermined quantity of lepidolite, and then fusing the whole batch.

6. The method of making opaque or translucent or specially formed glass or glass containing boracic acid, which consists in adding to a glass batch from one to fifty per cent. of lepidolite, and then fusing the whole batch.

7. The method of making glass which consists in first fusing lepidolite with a glass making ingredient, capable of producing an opaque or translucent glass and then adding it to a batch of glass.

8. The method of making glass which consists in first fusing lepidolite with a glass making ingredient capable of producing an opaque or translucent glass, and then adding to a batch of glass a quantity thereof not exceeding fifty per cent. of the weight of the batch of glass.

9. The method of making glass which consists in fusing lepidolite with glass producing materials, then bailing the fused glass, and then subsequently adding this fused material to a glass batch.

10. The method of manufacturing glass which consists in adding to a soda glass batch lepidolite, then fusing the batch thereby to produce an improved glass of superior appearance, temper and durability.

11. The method of making glass which consists in first fusing lepidolite with a glass making material and then adding the so fused material to a glass batch.

12. As an article of manufacture, glass having characteristics of fused lepidolite therein.

13. As an article of manufacture, glass having characteristics of fused lepidolite therein, and added thereto during the manufacture of such glass, whereby the strength, temper and appearance of the glass is materially improved.

14. The method of making glass, which consists in adding to an unfused batch of glass-making materials the mineral lepidolite, and then fusing the mixture.

15. The method of making glass, which consists in adding to an unfused batch of glass-making materials the mineral lepidolite in a fused condition, and then fusing the mixture.

Signed at 1822 Park Row building, New York city, this 19th day of July, 1917.

ERIK W. ENEQUIST.